Dec. 6, 1932.   C. H. FROELICH ET AL   1,890,049
DRIVING MECHANISM
Filed June 16, 1930    3 Sheets-Sheet 2

Inventors
Clarence H. Froelich
and Richard J. McCarty, Jr.
By R. S. A. Dougherty
Attorney Dec. 6, 1932.                 C. H. FROELICH ET AL                 1,890,049
                                 DRIVING MECHANISM
                          Filed June 16, 1930        3 Sheets-Sheet 3

Inventors
Clarence H. Froelich
and Richard J. McCarty, Jr.
By R. S. A. Dougherty
Attorney Patented Dec. 6, 1932

1,890,049

UNITED STATES PATENT OFFICE

CLARENCE H. FROELICH AND RICHARD J. McCARTY, JR., OF BETHLEHEM, PENNSYL-VANIA, ASSIGNORS TO BETHLEHEM STEEL COMPANY, A CORPORATION OF PENN-SYLVANIA

DRIVING MECHANISM

Application filed June 16, 1930. Serial No. 461,451.

Our invention relates to driving mechanisms. In connection with the problem of transmitting power from auxiliary engines to the trucks of the main locomotive or its tender, it is the practice to use a train of gears to obtain operative relations between the auxiliary engine and the axle of the truck. Such engines are entrained and disentrained by the employment of a gear which is moved in and out of mesh with a gear mounted on one of the axles of the truck. Heretofore under certain conditions of operation of the engine considerable shock occurred to the engine parts and power transmitting gears.

It is therefore one of the objects of our invention to provide means intermediate the engine and the axle to be driven which will relieve the operating parts from excessive shocks.

Another object of our invention is to provide means intermediate the driven gear and the axle to be driven which under normal conditions comprises a positive drive and which under abnormal conditions will slip or give to a certain degree and thereby relieve the operating parts from excessive shocks or stresses.

Another object of our invention is to provide a frictional drive between the engine and the aforesaid axle which constitutes a positive drive under normal conditions, but which will automatically slip or give to take care of any abnormal conditions due to excessive loads, etc., and which instantly assumes its normal condition as soon as the abnormal condition ceases.

Other novel features will be more fully understood from the following description and the claims taken with the drawings in which:

Figure 1:
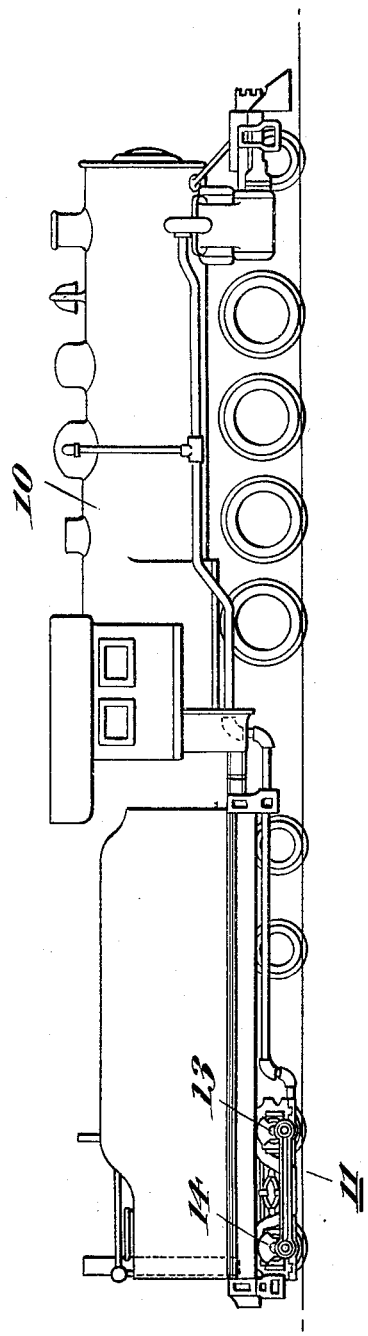
Fig. 1 illustrates diagrammatically a steam locomotive equipped with an auxiliary driving mechanism embodying our invention.
Figure 2:
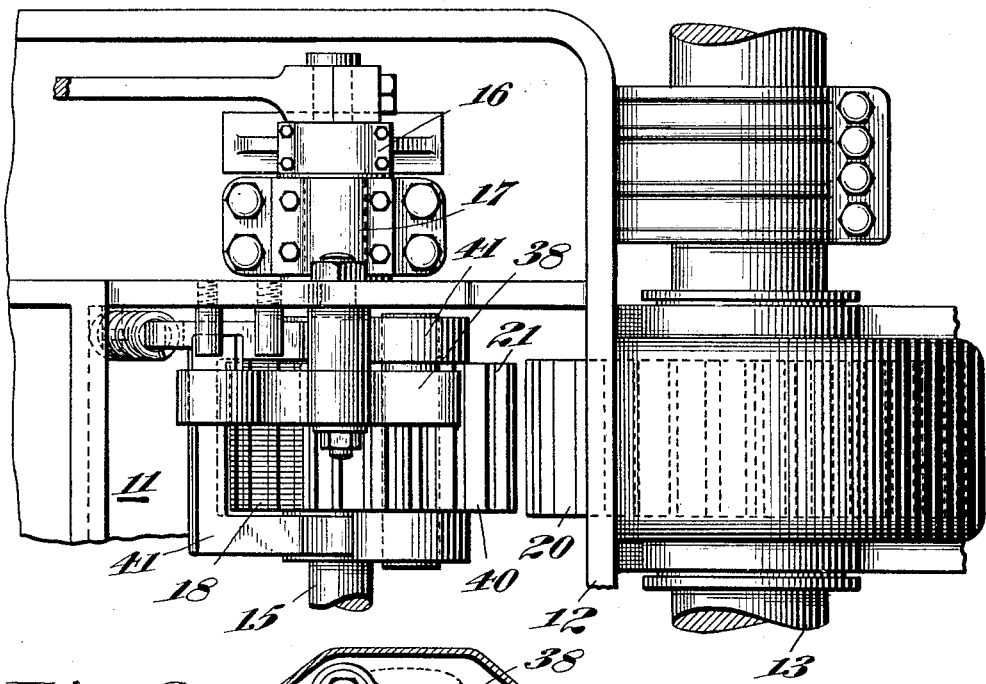
Fig. 2 is a detail fragmentary view of the auxiliary driving mechanism embodying our invention.

Referring to the drawings more in detail, 10 designates a main locomotive equipped with an auxiliary locomotive propulsion unit 11, which is of the type disclosed in Patent No. 1,710,372 to John A. McGrew, dated April 23, 1929, and the frame 12 which is mounted on the load bearing axles 13 and 14 of the main locomotive tender and is supplied with steam from the locomotive boiler and drives the crank shaft 15, which is mounted in suitable bearings 16 and 17 upon the frame 12.

The aforementioned crank shaft 15 is provided with a driving toothed gear 18 and the axle 13 is provided with a splined hub 19 upon which is operatively mounted a driven toothed gear 20. An intermediate idler gear 21 which is preferably in constant mesh with the driving gear is pivotally mounted on the engine frame 12 and is adapted to be moved into and out of engagement with the driven gear 20.

Power is transmitted from the gear 20 to the axle 13, through our improved mechanism 25 which under normal condition is always positive but which is so constructed that it will transmit only a predetermined maximum capacity of power.

The clutch 25 comprises a set of plates 26 which are preferably mounted on the splined hub 19 in such a manner that they are capable of longitudinal movement with respect to the hub but are retained in axial relation therewith. The gear 20 is preferably serrated around its inner periphery as at 27 and a second set of plates 28 which are serrated about their outer periphery to form teeth 22 are mounted in the gear 20 and are capable of lateral movement with respect to the gear but are retained in axial relation therewith.

The plates 26 and 28 are preferably lined with a frictional lining such as Raybestos. Cover plates 29 and 30, which are mounted within the respective ends of the gear 20, are provided to center this gear and also to confine the plates 26 and 28 in their proper relation within the gear 20. Spacing rings 31 and 32 are provided to retain the gear and clutch in their respective proper relation with the hub 19. The plate 29 is preferably provided with a series of pockets 33 within which are inserted the coil springs 34. The springs 34 engage the outer friction plate of the set 28 and function to exert the required pressure on the two set of plates to hold them in proper frictional engagement so that they will transmit the required load.

The plates 29 and 30 are preferably fastened to the gear 20 by a series of through bolts 35, fastened in their proper position by the nuts 36, and which are locked to the bolt by any suitable locking means such as the lock pin 37. The bolts 35 also serve to retain the springs 34 under compression.

Preferably the plates 29 and 30 are designed so that they will engage the sides of the gear 20 before the springs 34 are compressed to their limit and therefore it will be impossible to tighten the nuts 33 on the bolts 32 so as to fully compress the springs 34.

Figure 3:
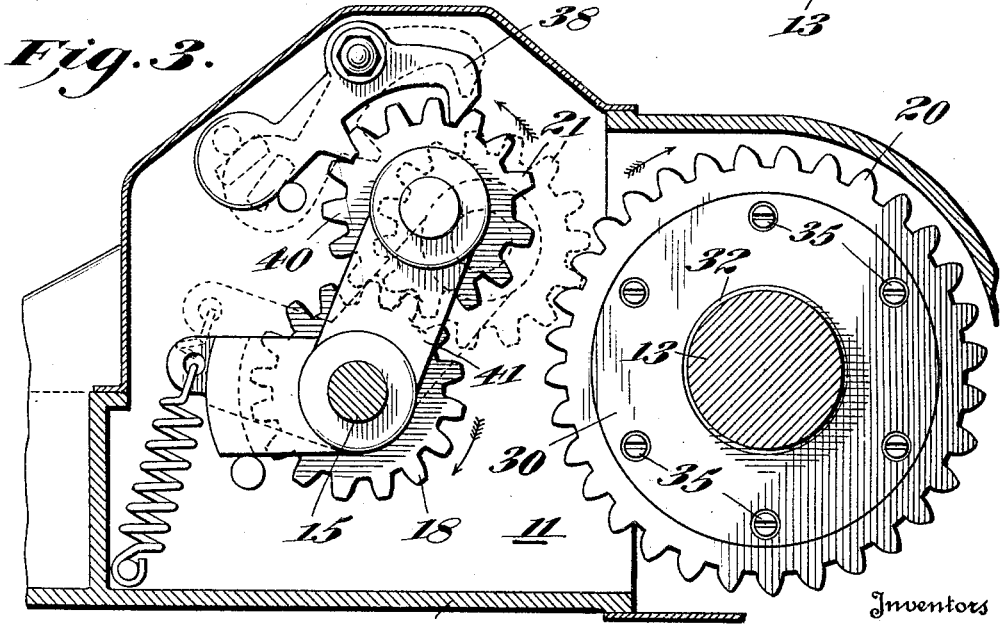
Fig. 3 is a vertical sectional view of mechanism shown in Fig. 2.
Figure 4:
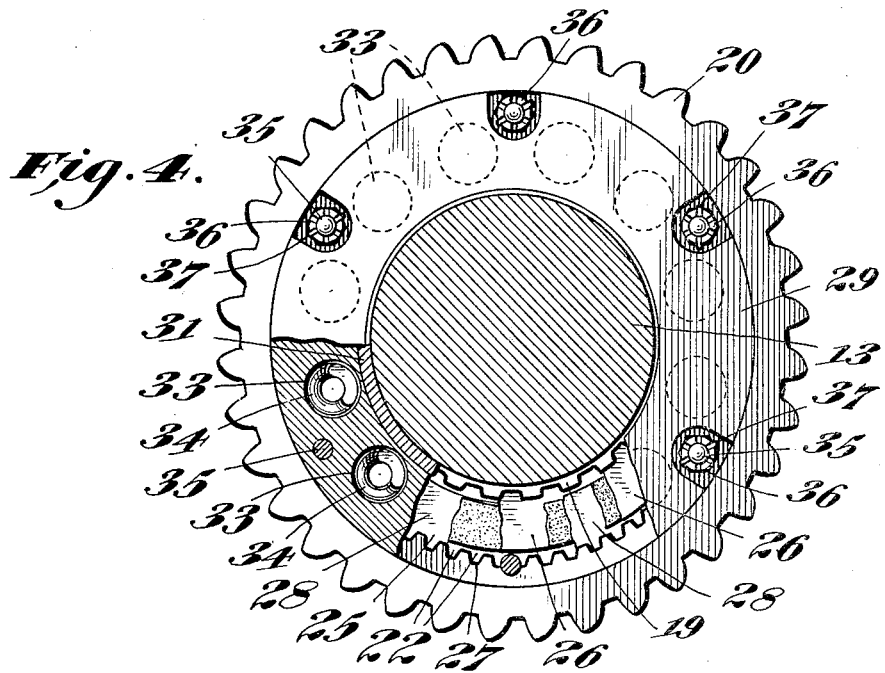
Fig. 4 is an end view of the driven gear shown in Fig. 2.
Figure 5:
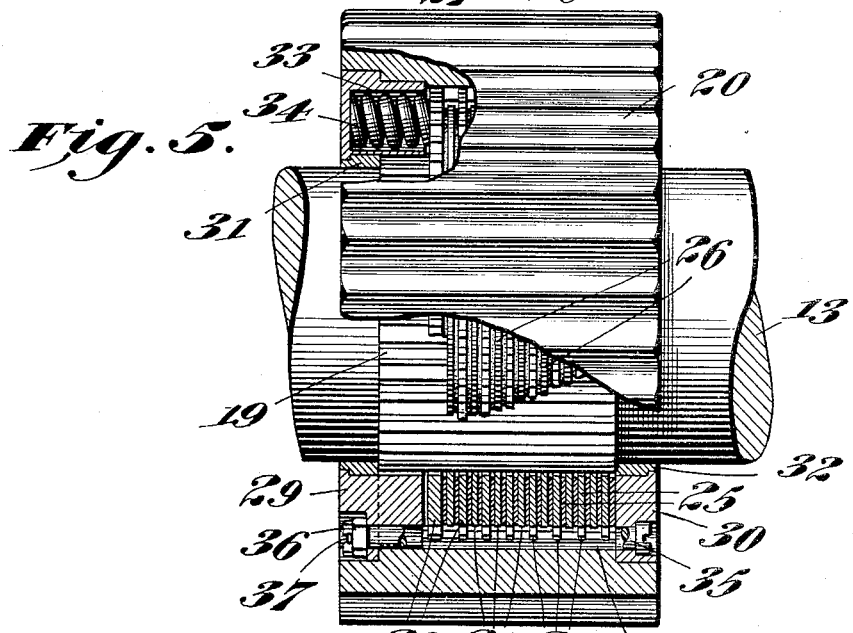
Fig. 5 is a side view of the gear shown in Fig. 4.

In operation assuming that the mechanism is in the position shown in Fig. 3 of the drawings; that is, with the gear 21 disentrained from the gear 20 and the driving gear is rotated in the direction indicated in the drawing, the escapement 38 being in engagement with the teeth 40 of the gear 21 will retard the rotation thereof about its axis and therefore will cause the carrier 41, which is pivotally mounted on the frame 12 and upon which the gear 21 is mounted, to rotate about its axis and entrain the gear 21 with the gear 20. Under normal condition, power will be transmitted positively through the gear 20 to the axle 13. However, should there be an excessive load on the axle 13 or if the main locomotive was set to drive the axle in the opposite direction to that which the auxiliary engine is operatively set to drive the axle, the friction discs or plates 26 and 28 would move relatively and angularly to each other and therefore the excessive load would not abnormally stress the operating parts but would be dissipated on account of such movement. As soon as the conditions again became normal the discs will function as a positive drive.

From the foregoing description it will be seen that we have devised a mechanism applicable to an engine drive and which is particularly suitable for the transmission of heavy loads, and at the same time safeguards the engine parts against destructive stresses when subject to abnormal loads.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim and desire to secure by Letters Patents is:

1. In power transmission gearing, a driven shaft, a driven gear rotatably mounted on the said shaft, bearings mounted upon the said shaft, cover plates on the opposite sides of the said gear and engaging the said bearings to center and fix axially the said gear upon the said shaft, fastening means for retaining the said cover plates in fixed assembled relation with the said gear, and means intermediate the said driven gear and the said axle adapted to operatively connect the said driven gear and the said axle under normal operative conditions, and adapted to relieve the parts from excessive stresses when subjected to abnormal loads, said means comprising a set of friction discs splined to the axle, a second set of friction discs intercalate the first mentioned set and connected to the driven gear, and coil springs assembled in compression intermediate one of the said cover plates and the intercalated nest of friction plates.

2. In power transmission gearing, a driven shaft, a driven gear rotatably mounted on the said shaft, bearings mounted upon the said shaft, cover plates on opposite sides of the said gear and engaging the said bearings to center and fix axially the said gear upon the said shaft and one of said cover plates having plural cylindrical recesses opening inward, fastening means for retaining the said cover plates in fixed assembled relation with the said gear, and means intermediate the said driven gear and the said axle adapted to operatively connect the said driven gear and the said axle under normal operative conditions, and adapted to relieve the parts from excessive stresses when subjected to abnormal loads, said means comprising a set of friction discs splined to the axle, a second set of friction discs intercalate the first mentioned set and connected to the driven gear, a third set of friction discs intercalate the first and second mentioned sets and in floating relation thereto, and coil springs assembled in the said cylindrical recesses in compression intermediate the recessed cover plate and the intercalated nest of friction plates.

In testimony whereof we hereunto affix our signatures.

CLARENCE H. FROELICH.
RICHARD J. McCARTY, Jr.